United States Patent [19]

Hirata et al.

[11] Patent Number: 4,974,666
[45] Date of Patent: * Dec. 4, 1990

[54] REFRACTORY BRICK ASSEMBLY FOR A HEAT REGENERATOR

[75] Inventors: Kimio Hirata; Yasuo Saito; Masaki Takemoto, all of Chiba, Japan

[73] Assignee: Toshiba Monofrax Co., Ltd., Chiba, Japan

[*] Notice: The portion of the term of this patent subsequent to Oct. 17, 2006 has been disclaimed.

[21] Appl. No.: 356,114

[22] Filed: May 24, 1989

[30] Foreign Application Priority Data

May 31, 1988 [JP] Japan .................................. 63-133576
Oct. 31, 1988 [JP] Japan .................................. 63-273110

[51] Int. Cl.⁵ ............................................. F28D 17/02
[52] U.S. Cl. ...................................... 165/9.1; 165/9.4; 52/606
[58] Field of Search ........................ 52/606, 608, 609; 165/9.1, 9.2, 9.3, 9.4

[56] References Cited

U.S. PATENT DOCUMENTS

| | | | |
|---|---|---|---|
| 2,389,166 | 11/1945 | Seaver | 165/9.1 |
| 2,833,532 | 5/1958 | Ries | 52/606 X |
| 4,436,144 | 3/1984 | Horak . | |
| 4,540,039 | 9/1985 | Karl . | |
| 4,874,034 | 10/1989 | Hirata et al. | 165/9.1 |

FOREIGN PATENT DOCUMENTS

| | | | |
|---|---|---|---|
| 667448 | 2/1954 | United Kingdom | 165/9.1 |
| 2122328 | 1/1984 | United Kingdom | 165/9.1 |

*Primary Examiner*—Richard E. Chilcot, Jr.
*Attorney, Agent, or Firm*—Ronald P. Kananen

[57] ABSTRACT

In a refractory brick assembly for a heat regenerator, a plurality of brick units are assembled so as to form many long vertical gas flow passages. Each outer wall of the brick units has four corner portions each of which has a plurality of convex and concave strips. That can engage with each other so as to hold the brick units due to the friction between them. A high projection is formed on at least one of the inner and outer walls for producing a turbulent flow.

19 Claims, 8 Drawing Sheets

REFRACTORY BRICK ASSEMBLY FOR A HEAT REGENERATOR

BACKGROUND OF THE INVENTION

This invention relates to a refractory brick assembly for a heat regenerator adapted to be used in a glass fusion furnace.

FIG. 16 shows a conventional refractory brick assembly comprising a plurality of refractory brick units 1 made of an electro-cast refractory material. Each refractory unit 1 has the uniform thickness over a full length thereof. The refractory units are vertically piled in such a manner that a plurality of flow passages 2 are formed as to extend in a vertical direction. Four corners 1a of each refractory unit 1 are so cut that a cross section thereof is octagonal. The corners 1a of horizontally adjacent refractory units 1 contact each other while the upper ends 1b contact the corresponding lower ends 1c.

In such a conventional brick assembly, the flow passages 2 are separate from each other so that the gas flows independently through each flow passage 2. For example, once gas enters the lower open end of a specific lowermost refractory unit, the gas flows through only one flow passage defined by a series of refractories vertically joined to each other and then flows out of the upper open end of the uppermost refractory unit. The gas never flows into any adjacent flow passage. Therefore, if the gas temperature at a starting level is not uniform, some low-temperature gas portion flows through a specific flow passage while some high-temperature gas portion flows through another specific flow passage. Those gases are not mixed. In addition, separate gases may flow at different flow rates through the separate flow passages. As a result, the heat exchange rate is variable and not uniform at a certain horizontal level. The gas also may flow through the flow passages 2 as a laminar air flow and not a turbulent air flow. Thus, a convection-type heat exchange cannot be easily carried out at a high efficiency.

SUMMARY OF THE INVENTION

An object of this invention is to provide refractory brick assembly for a heat regenerator in which a convection-type gas flow can be improved so that uniform temperature distribution of gas flow can be obtained in order to increase heat exchange efficiency.

A further object of this invention is to provide a refractory brick assembly for a heat regenerator in which a turbulent gas flow can easily take place.

According to this invention, a refractory brick assembly for a heat regenerator comprises a plurality of refractory brick units each having a gas flow inner wall and a gas flow outer wall. Each outer wall has four corner portions each of which has a plurality of convex and concave means in such a manner that the concave means can engage with the convex means so as to hold the brick units by the friction between them. A preferred example of the convex and concave means is a combination of two corresponding strips extending in parallel to a direction at a right angle to the center of a gas flow passage. Although the inner and outer walls can be flat, it is preferable that each wall has convex and concave strips which can extend in any direction. Preferably, the convex and concave strips include a series of crests and roots which are arranged one after the other in the shape of bellows or a sawtooth.

When plural brick units are assembled in a predetermined manner and order, the convex and concave strips of the refractory unit engage those of another refractory unit only at the adjacent corner portions of the refractory units.

A number of selected adjacent refractory units ar placed separate from each other in a vertical direction. For example, a flat top end of a lower refractory unit is separate from a flat bottom end of an upper refractory unit forming four cross-flow passages between the units. Preferably, two types of first and second units are stacked in both vertical and horizontal directions form a plurality of vertical flow passages connected through a plurality of horizontal cross-flow passages. The length of the first type of units is longer than that of the second type of units, and the difference in length between the first and second type of units corresponds to the width of the cross-flow passages in the vertical direction. In this case, the ratio of the length of the first type of units to that of the second type of units preferably ranges between ½ and 9/10. If the ratio is more than 9/10, impurities in the gas are apt to be affixed to the cross-flow passages to such a degree that the gas cannot flow efficiently. If it is less than ½, the area of the strips on the corner portions may be too small to support the units in a stable condition. Also, the number of the first type of units is preferably larger than that of the second type of units at any vertical level in order to obtain a stable assembly.

At least one of the inner and outer walls has at least one strip-shaped projection along a lower and/or upper end of each refractory unit so as to form at least one loop-like or flange-like projection in each vertical flow passage. The projection extends in a direction at a right angle to the center of the flow passage. In combination with such a projection, the inner and outer walls are preferably formed in the shape of a plurality of convex and concave strips such as a series of crests and roots which are arranged one after another like bellows or a sawtooth. The height of the flange-like projection is larger than that of the strips, and the ratio of the total length of the unit to the height of the projection is preferably between 7 and 21.

BRIEF DESCRIPTION OF THE DRAWINGS

FIG. a perspective view showing a refractory brick assembly for a heat regenerator according to a first embodiment of this invention.

DETAILED DESCRIPTION OF THE EMBODIMENTS

Figure 1:
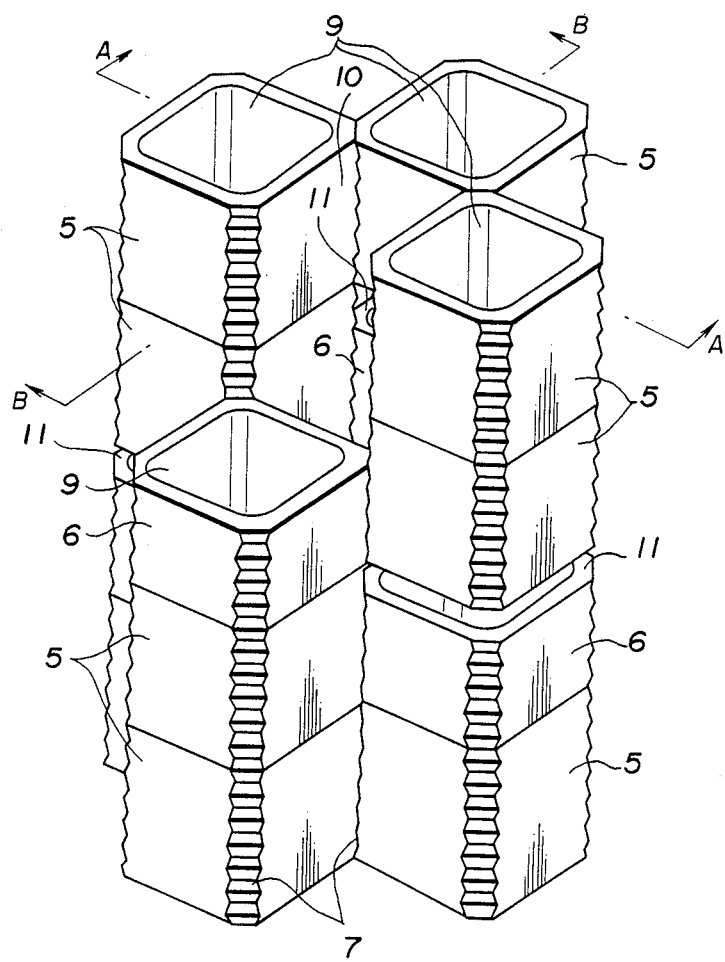
Figure 2:
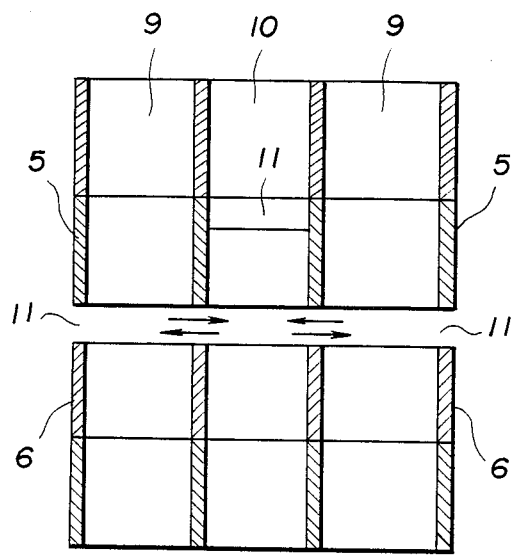
FIG. 2 is a sectional view taken along the line A-A in FIG. 1.
Figure 3:
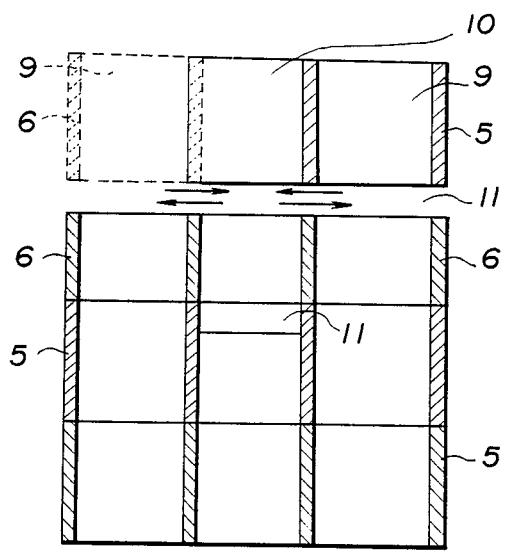
FIG. 3 is a sectional view taken along the line B-B in FIG. 1.
Figure 4:
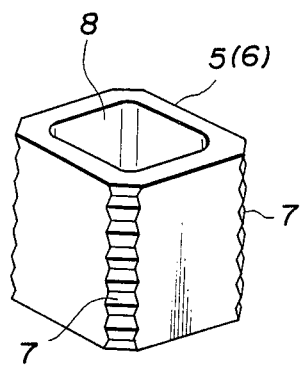
FIG. 4 is a perspective view showing a refractory unit used in the brick assembly of FIG. 1.

FIGS. 1 to 4 show a refractory brick assembly for a heat regenerator according to a preferred embodiment of the invention in which two types of first and second refractory units 5, 6 are assembled so as to form a plurality of vertical gas flow passages 9, 10. The ratio of the length of the second unit 6 to that of the first unit 5 ranges between ½ and 9/10. For example, if the first unit 5 has a length of 150 mm, the second unit 6 has a length of 75 to 135 mm. Both of the first and second units are preferably made of an alumina-silica-zirconia material and produced by an electric fused casting method or firing method.

The first and second units 5, 6 are substantially the same in shape exception for the length thereof. Each unit 5, 6 has a flat upper end surface, a flat lower end surface and a gas flow passage 8. The lower and upper end surfaces are in parallel. The passage 8 has a substantially square cross-section and extends along its center between the end surfaces. The units 5, 6 have an octagonal contour in cross section so as to form four corner portions 7. The corner portions 7 are formed with a plurality of convex and concave strips in series which extend in parallel to a plane at a right angle to the center the flow passage 8. The inner and outer walls of the units ar flat except for the corner portions.

The strips 7 are formed in the shape of a sawtooth or bellows so that a series of crests and roots are arranged one after another. The convex and concave strips 7 of the adjacent units engage each other when they are assembled. One of the four corner portions 7 of a unit engages the corresponding corner portion 7 of a horizontally adjacent unit in such a manner that the convex strips are in contact with the concave strips whereby the units can be held in position even if a lower unit does not contact or support an upper unit in a vertical direction.

When a set of four refractory units are arranged along a horizontal plane, in addition to the gas flow passage 9 formed in each refractory unit, another gas flow passage 10 is defined thereby.

The refractory units are horizontally arranged in contact with one another and vertically stacked in such a manner that a plurality of long flow passages are formed extending in a vertical direction.

In the embodiment of FIGS. 1 to 4, two first units 5 and a single second unit 6 are repeatedly stacked as one set in a vertical direction so as to form a long vertical flow passage 9. The vertically adjacent ends of the units contact each other, but four rectangular spaces or cross-flow passages 11 are preferably formed by the second unit 6 and the first units 5 at regular intervals. For example, in case of the right hand gas flow passage 9 of FIG. 1, the second unit 6 contacts the lower first unit 5 and does not contact the upper first unit 5. Although the upper first unit 5 is not supported by the second unit 6, it does not fall because it is held by the horizontally adjacent second unit 6 supported by the vertically adjacent first units 5.

The cross-flow passages 11 function as a bypass so that the gas can flow horizontally from one vertical flow passage into other vertical flow passages. In other words, the vertical flow passages are connected by the horizontal flow passages 11 whereby the gas can flow in any vertical and horizontal directions from a high-pressure portion to a low-pressure portion in the heat regenerator.

A brick assembly according to this invention can have remarkable advantages if hot exhaust gas from a blowing exit of a glass fusing furnace (not shown) is used to heat cold refractory units 5, 6 in such a manner that the gas flows downwardly, or if cold combustion air is preheated by hot refractory units 5, 6 so that the air flows upwardly. When the hot gas flows downwardly through the flow passages 9, 10 so as to heat the refractory units 5, 6, even if some relatively hot gas portion takes place in a specific vertical flow passage 9, 10, the hot gas portion can flow horizontally through the cross-flow passages 11 into other vertical flow passages 9, 10 which are at a relatively low temperature. Thus, the temperature distribution can become gradually uniform. Also, when the cold air flows upwardly, even if some relatively cold air is present in a particular vertical flow passage, it can flow horizontally through the cross-flow passages into other vertical flow passages. Thus, there remain ultimately no units which continue to be partly hot. Therefore, heat exchange efficiency can be increased.

It is apparent that this invention is not limited to the above-stated embodiment. The cross-flow passages 11 can be formed in any other modes, but it is preferable that the total volume of the cross-flow passages 11 is substantially 20 % of that of the whole assembly or less.

Figure 5:
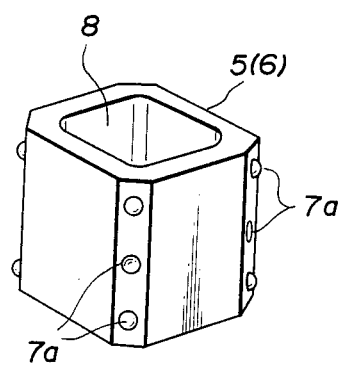
FIGS. 5 to 8 are perspective views showing other various refractory units for use in a brick assembly according to the invention.

The corner portions 7 of the units 5, 6 can be formed in any desired shape if the units can be supported by the horizontally adjacent units in a stable condition. For example, FIG. 5 shows a refractory brick unit 5, 6 having simple corner portions each of which has a flat portion, two hemispherical convex portions and one concave portion for receiving one of them.

Figure 6:
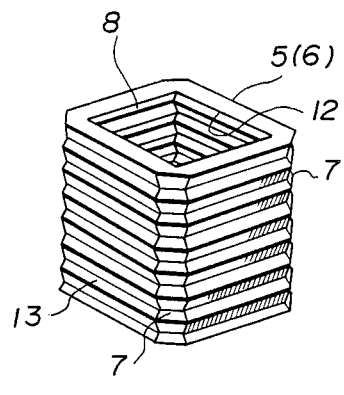
Figure 7:
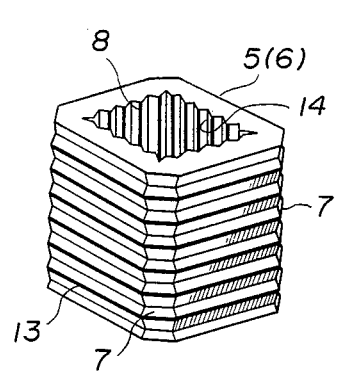

FIGS. 6 and 7 show other refractory brick units for use in a heat regenerator according to the invention. The passage 8 has substantially a square cross-section and extends along its center between both opposite flat ends. The unit 5, 6 has an octagonal contour in cross section so as to form four corner portions 7. The refractory unit has a plurality of convex and concave strips 12, 13 in the shape of sawtooth or bellows, except for the ends. The convex and concave strips 13 of the outer wall extend in parallel to a plane at a right angle to the center of the flow passage 8. The convex and concave strips 12, 14 of the inner wall extend along the center of the flow passage 8 as shown in FIG. 7, or in parallel to a plane at a right angle to the center of the flow passage 8 as shown in FIGS. 6.

FIGS. 8 to 14 show other various types of refractory units.

Figure 8:
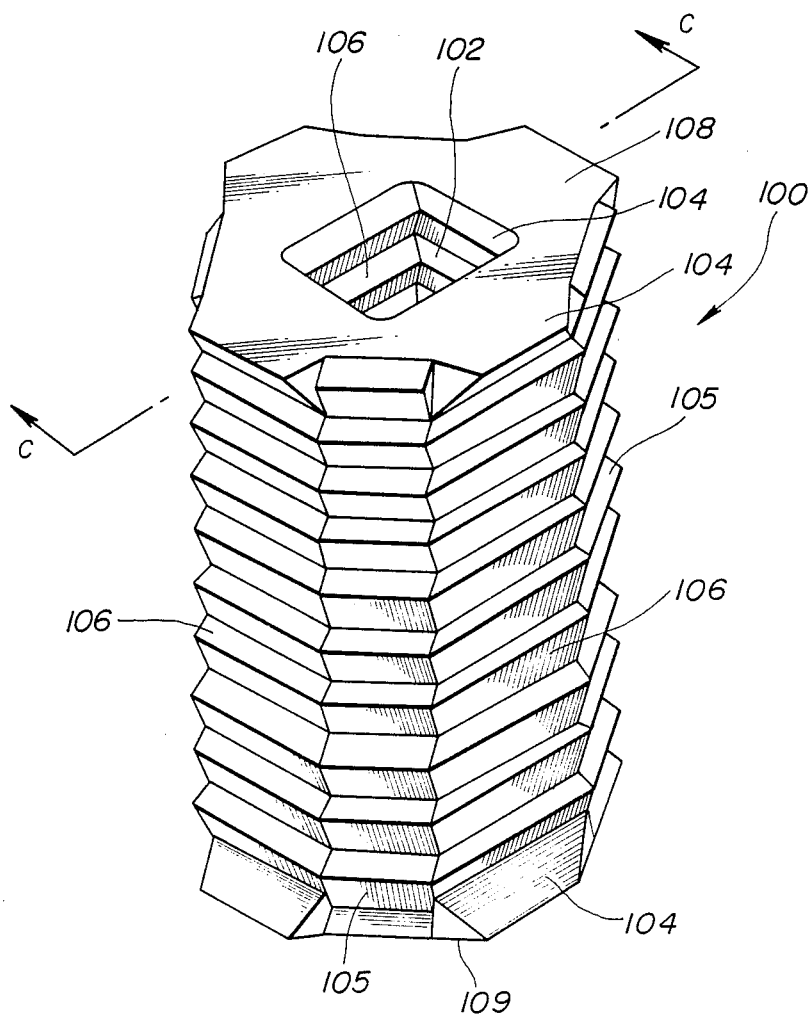
Figure 9:
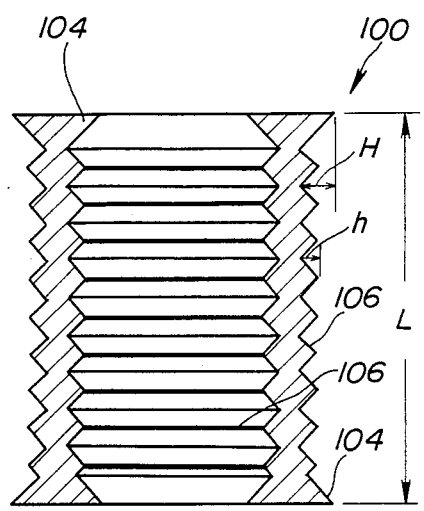
FIG. 9 is a sectional view showing the refractory unit along the line C-C of FIG. 8.

In FIGS. 8 and 9, each of the inner and outer walls has a loop-like or flange-like projection 104 at both lower and upper ends of each refractory unit 100. The projections 104 extend along the ends of the unit or a plane at a right angle to the center of a flow passage 102. In combination with such projections 104, the inner and outer walls have a plurality of convex and concave strips 106 formed in the shape of bellows or a sawtooth. The height H of the flange-like projection 104 is larger than the height h of the strips 106, and the ratio of the length L of the unit 100 to the height H of the projection 104 is preferably between 7 and 21.

The passage 102 has substantially a square cross-section and extends along its center between both opposite flat ends 108, 109. The unit 100 has an octagonal contour in cross section so as to form four corner portions 105 which substantially correspond to the corner portions 7 shown in FIGS. 1 to 7. The refractory unit 100 has a plurality of low convex and concave strips on the whole area in the shape of sawtooth or bellows except for the ends 108, 109. The convex and concave strips 106 extend in parallel to a plane at a right angle to the center of the flow passage 102.

Figure 10:
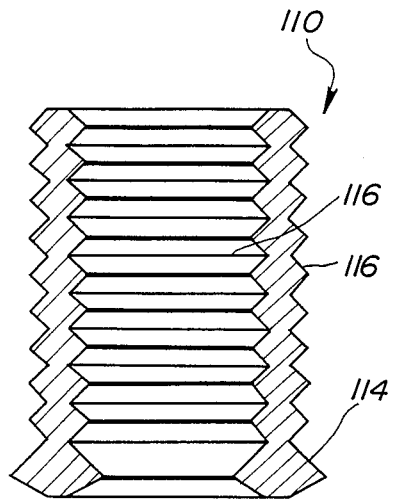
FIGS. 10 to 14 are sectional views showing other refractory units for use in a brick assembly.
Figure 11:
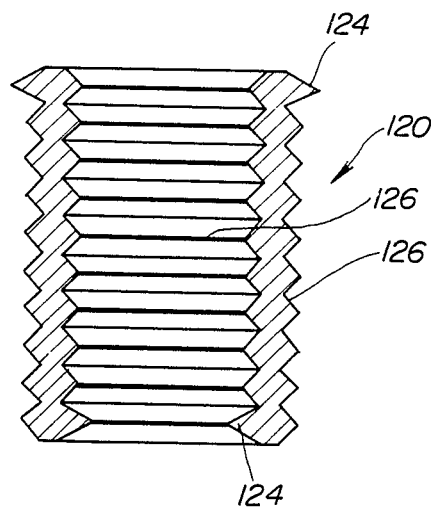
Figure 12:
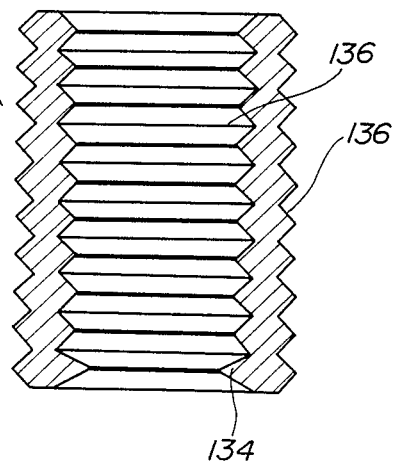
Figure 13:
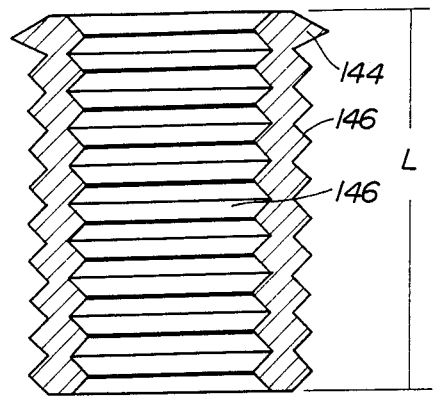
Figure 14:
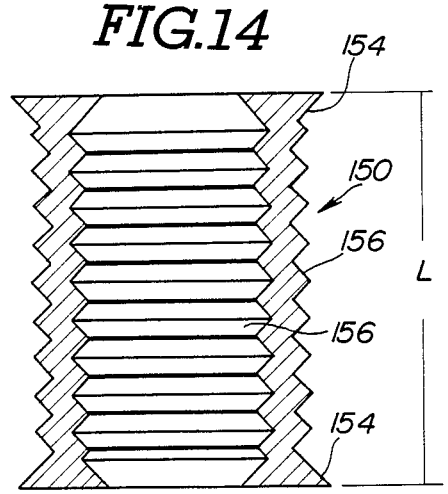

Except for the shape and position of the flange-like projection 104, units 110, 120, 130, 140, 150 are substantially the same as that of FIG. 9. The units have inner and outer walls formed with bellows or a sawtoothed-shaped strips 126, 136, 146, 156. In FIG. 10, a flange-like projection 114 is formed along each lower end of the inner and outer walls. In FIG. 12, a flange-like projection 134 is formed along a lower end of an inner wall only. In FIG. 13, a flange-like projection 144 is formed along an upper end of an outer wall only. In FIG. 14, the low strips 156 are displaced by a half pitch between the inner and outer walls.

According to the embodiments of FIGS. 8 to 14, because the flange-like projection effectively prevents the gas from flowing in a laminar manner, turbulent flow effects can be remarkably improved in combination with the increased specific surface effects so that a high efficiency heat transfer can be obtained.

Figure 15:
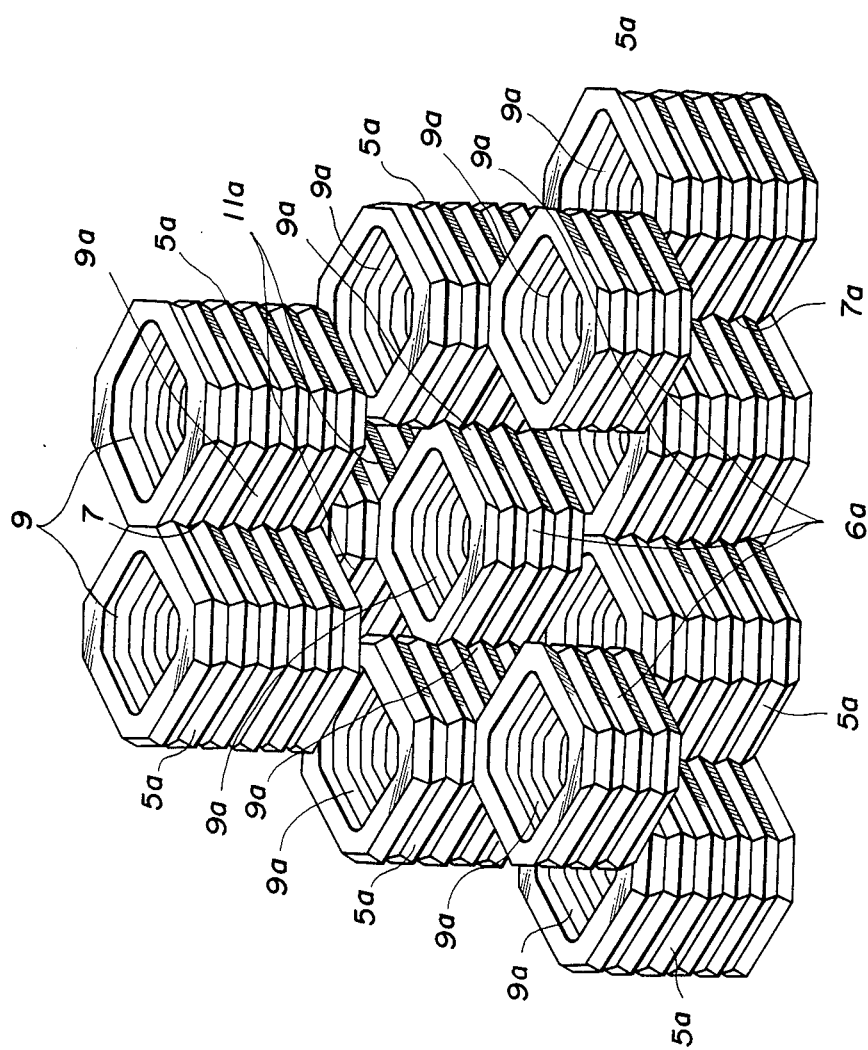
FIG. 15 is a perspective view showing another brick assembly according to this invention.
Figure 16:
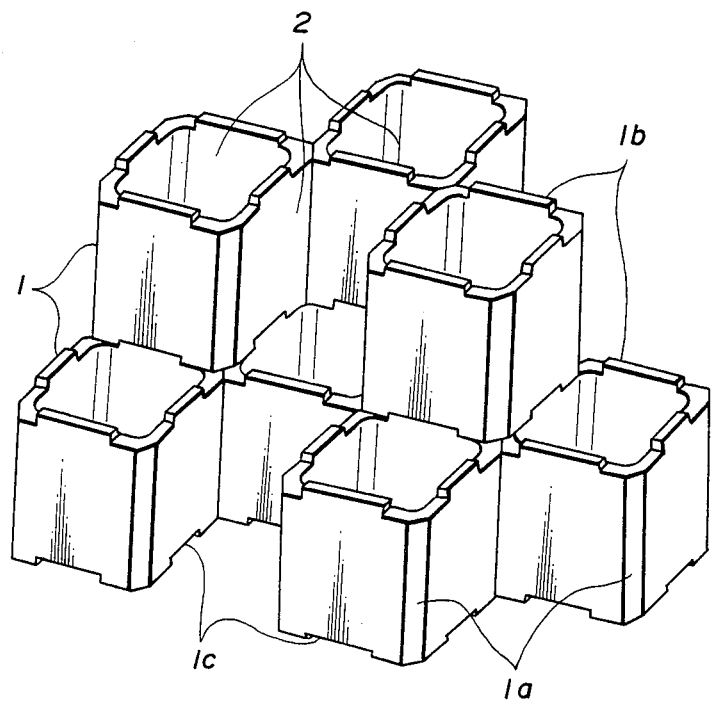
FIG. 16 is a perspective view showing a conventional brick assembly.

FIG. 15 shows another brick assembly in which the first and second units 5a, 6a are similar to those of FIGS. 1 to 4, except that each flow passage 9a defined by the inner wall thereof has a substantially octagonal contour cross-section corresponding in shape to that of the outer wall. Four units 5a, 6a are arranged as one set at each level. In a vertical direction, each of a plurality of short vertical passages 9a is connected to each of a plurality of short vertical passages 11a defined by the four outer walls of the units one after the other. Plural cross-flow passages are formed between the first and second units 5a, 6a.

Although not shown, convex and concave strips of an outer wall can be designed so as to extend along the center of the flow passage like the strips 14 on the inner wall of FIG. 7. Preferred examples of such strips are disclosed in Japanese Patent Application No. 63—273110.

We claim:

1. A refractory brick assembly for a heat regenerator comprising a plurality of brick units assembled in both horizontal and vertical directions for forming a plurality of long vertical flow passages, each of the brick units having an inner wall, an outer wall and two opposite open ends, the inner wall defining a part of the vertical flow passages and having a center line between the open ends, the outer wall defining a part of the vertical flow passages, the outer wall having four corner portions which are arranged in contact with each other when they are assembled, each corner portion having concave and convex means in such a manner that the concave means can engage with the convex means when the adjacent corner portions engage with each other so that the brick units can be held in position, some selected brick units among the brick units being separate from vertically adjacent brick units so as to form cross-flow passages between them so that the vertical flow passages are connected to each other through the cross-flow passages.

2. A refractory brick assembly as defined in claim 1, wherein the concave and convex means is a combination of concave and convex strips which extend in parallel to a plane at a right angle to the center line of the flow passage.

3. A refractory brick assembly as defined in claim 1, wherein the concave and convex means is formed in the shape of bellows or a sawtooth.

4. A refractory brick assembly as defined in claim 1, wherein the convex and concave means is a combination of a hemispherical convex portion and a concave portion for receiving the hemispherical convex portion therein.

5. A refractory brick assembly as defined in claim 1, wherein the brick units comprise two types of brick units each of which is substantially the same in shape except that one type of brick unit has a relatively short length in comparison with the other type of brick unit.

6. A refractory brick assembly as defined in claim 1, wherein the inner and outer walls have convex and concave strips.

7. A refractory brick assembly as defined in claim 1, wherein the opposite ends are flat and parallel.

8. A refractory brick assembly as defined in claim 1, wherein each of the brick units has an octagonal contour in cross-section so as to form the four corner portions on the outer wall.

9. A refractory brick assembly as defined in claim 1, wherein the brick units include a first type of units having a standard length and a second type of units having a relatively short length forming the cross-flow passages between the first type of units and the second type of units when they are assembled.

10. A refractory brick assembly as defined in claim 9, wherein the difference in length between the first and second type of units corresponds to the width of the cross-flow passages in a vertical direction.

11. A refractory brick assembly as defined in claim 9, wherein the ratio of the length of the second type of units to the length of the first type of units ranges between ½ and 9/10.

12. A refractory brick assembly as defined in claim 9, wherein the number of the first type of units is larger than that of the second type of units at any vertical level.

13. A refractory brick assembly as defined in claim 1, wherein at least one projection is formed on at least on of the inner and outer walls for producing a turbulent gas flow, the height of the projection being larger than that of the strips, and wherein plural projections are placed in the shape of a flange in the vertical flow passages when the brick units are assembled.

14. A refractory brick assembly as defined in claim 13, wherein selected brick units among the brick units are separate from vertically adjacent brick units so as to form cross-flow passages between them so that the vertical flow passages are joined to each other through the cross-flow passages.

15. A refractory brick assembly as defined in claim 14, wherein the ratio of the total length of the brick units to the height of the projection ranges between 7 and 21.

16. A refractory brick assembly as defined in claim 14, wherein the opposite ends are flat and the cross-flow passages have a rectangular section.

17. A refractory brick assembly as defined in claim 14, wherein the total volume of the cross-flow passages is substantially 20% or less of that of the whole assembly.

18. A refractory brick assembly as defined in claim 1, wherein the total volume of the cross-flow passages is substantially 20% or less of that of the whole assembly.

19. A refractory brick assembly for a heat regenerator comprising a plurality of brick units assembled in both horizontal and vertical directions for forming a plurality of vertical flow passages, each of the brick units having an inner wall, an outer wall and two opposite open ends, the inner and outer walls having concave and convex strips, at least one projection formed on at least one of the inner and outer walls for producing a turbulent gas flow, the height of the projection being larger than that of the strips whereby a plurality of projections are placed in the shape of a flange in the vertical flow passages when the brick units are assembled.

* * * * *